US011218338B2

(12) United States Patent
Kitano

(10) Patent No.: US 11,218,338 B2
(45) Date of Patent: Jan. 4, 2022

(54) COMMUNICATION SYSTEM AND SERVER SWITCHING METHOD

(71) Applicant: Nippon Telegraph and Telephone Corporation, Tokyo (JP)

(72) Inventor: Takehiro Kitano, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 23 days.

(21) Appl. No.: 16/967,576

(22) PCT Filed: Feb. 13, 2019

(86) PCT No.: PCT/JP2019/005022
§ 371 (c)(1),
(2) Date: Aug. 5, 2020

(87) PCT Pub. No.: WO2019/159941
PCT Pub. Date: Aug. 22, 2019

(65) Prior Publication Data
US 2021/0243052 A1 Aug. 5, 2021

(30) Foreign Application Priority Data

Feb. 14, 2018 (JP) .............................. JP2018-023688

(51) Int. Cl.
*G06F 15/16* (2006.01)
*H04L 12/46* (2006.01)
(Continued)

(52) U.S. Cl.
CPC ...... *H04L 12/4675* (2013.01); *H04L 41/0668* (2013.01); *H04L 41/0816* (2013.01); *H04L 61/103* (2013.01); *H04L 67/1034* (2013.01)

(58) Field of Classification Search
CPC ............. H04L 12/4675; H04L 41/0668; H04L 41/0816; H04L 61/103; H04L 67/1034; H04L 12/2856; G06F 13/00
(Continued)

(56) References Cited

U.S. PATENT DOCUMENTS 6,240,462 B1 * 5/2001 Agraharam ......... H04L 12/2856
370/238
6,512,774 B1 * 1/2003 Vepa ....................... H04L 69/40
370/242
(Continued)

FOREIGN PATENT DOCUMENTS

WO WO-2021091693 A1 * 5/2021 ............ A61M 5/145

OTHER PUBLICATIONS

Atmarkit.com.jp. [online], "Operate servers actively/standby," 2017, retrieved on Dec. 21, 2017, retrieved from URL<http://www.atmarkit.com.jp/ait/articles/0304/09/news001.html>, 19 pages (with English Translation).
(Continued)

*Primary Examiner* — Karen C Tang
(74) *Attorney, Agent, or Firm* — Fish & Richardson P.C.

(57) ABSTRACT

A communication system includes multiple servers each functioning as an active system or a standby system and a relay device that relays communication between a server of the active system and one or more client terminals operated by clients. Each of the servers includes a priority level determining unit that determines a priority level of each of the clients, a virtual port creating unit that creates, in the server, a virtual port corresponding to a virtual LAN assigned to each of the client terminals, and a communication processing unit (CPU) that instructs the relay device to change a destination of communication performed between the client terminal and the server to the virtual port. The
(Continued)

CPU gives an instruction of change of the destination of the communication in order of highest to lowest priority level of the client when a malfunction occurs in another server of the active system.

5 Claims, 13 Drawing Sheets

(51) Int. Cl.
*H04L 12/24* (2006.01)
*H04L 29/12* (2006.01)
*H04L 29/08* (2006.01)
*G06F 15/173* (2006.01)

(58) Field of Classification Search
USPC .......................................................... 709/224
See application file for complete search history.

(56) References Cited

U.S. PATENT DOCUMENTS

| | | | | |
|---|---|---|---|---|
| 8,995,301 B1* | 3/2015 | Miller | ..................... | H04L 45/14 370/254 |
| 2003/0152063 A1* | 8/2003 | Giese | ..................... | H04L 29/06 370/349 |
| 2006/0190243 A1* | 8/2006 | Barkai | ..................... | G06F 16/278 704/8 |
| 2008/0062994 A1* | 3/2008 | Porat | ..................... | H04L 45/00 370/392 |
| 2008/0181225 A1* | 7/2008 | Zampiello | ..................... | H04L 12/1859 370/390 |
| 2009/0161569 A1* | 6/2009 | Corlett | ..................... | H04L 43/0858 370/252 |
| 2012/0177039 A1* | 7/2012 | Berman | ..................... | H04L 41/12 370/390 |
| 2013/0339547 A1* | 12/2013 | Nath | ..................... | H04L 61/103 709/245 |
| 2015/0117179 A1* | 4/2015 | Sato | ..................... | H04L 45/00 370/219 |
| 2015/0215158 A1* | 7/2015 | Suryavanshi | ..................... | H04L 65/1063 370/221 |
| 2021/0168125 A1* | 6/2021 | Vemulpali | ..................... | H04L 61/103 |
| 2021/0243052 A1* | 8/2021 | Kitano | ..................... | H04L 41/0816 |

OTHER PUBLICATIONS

Infraexpert.com, [online], "Understanding VLANs," 2017, retrieved on Dec. 21, 2017, retrieved from URL<http://www.infraexpert.com/study/vlanz1.html>, 17 pages (with English Translation).

* cited by examiner

17a CLIENT DATA

| CLIENT NO. | PREVIOUS USAGE TIME | ACCUMULATED USAGE TIME | USAGE FREQUENCY |
|---|---|---|---|
| A○○ | 2018/01/31/18:26 | 110:18 | HIGH INTERMEDIATE |
| B○○ | 2017/12/26/23:05 | 17:46 | LOW LOW |
| C○○ | 2018/02/01/17:50 | 148:05 | HIGH HIGH |
| ⋮ | ⋮ | ⋮ | ⋮ |

Fig. 4A

| VIRTUAL PORT NO. | IP ADDRESS (VIRTUAL IP OF VLAN 50) | MAC ADDRESS |
|---|---|---|
| A△△ | 10.10.1.1 | bb-bb-bb-bb-bb-bb |
| B△△ | 10.10.1.2 | bb-bb-bb-bb-bb-bb |
| C△△ | 10.10.1.3 | bb-bb-bb-bb-bb-bb |
| ⋮ | ⋮ | ⋮ |

17b VIRTUAL IP DATA

Fig. 4B

COMMUNICATION SYSTEM AND SERVER SWITCHING METHOD

CROSS-REFERENCE TO RELATED APPLICATIONS

This application is a National Stage application under 35 U.S.C. §371 of International Application No. PCT/JP2019/005022, having an International Filing Date of Feb. 13, 2019, which claims priority to Japanese Application Ser. No. 2018-023688, filed on Feb. 14, 2018. The disclosure of the prior application is considered part of the disclosure of this application, and is incorporated in its entirety into this application.

TECHNICAL FIELD

The present invention relates to a communication system that switches between an active server and a standby server, and a server switching method.

BACKGROUND ART

A communication system that provides a variety of services to client terminals operated by clients is required to have high reliability and thus typically includes, in addition to a server (an active server) that normally performs processing, a server (a standby server) that normally stands by without performing processing in preparation for a time when the active server is unable to perform processing. The standby server monitors an operation of the active server and switches its own setting from a standby system to an active system in a case in which it is determined that the active server has malfunctioned and is unable to perform processing.

Relating to such a communication system, for example, there is a communication system 603 illustrated in FIGS. 8A and 8B, and FIG. 9 to be described below as a conventional example. The communication system 603 as the conventional example illustrated in FIGS. 8A and 8B, and FIG. 9 is a system that uses virtual IP address technology and virtual LAN (virtual local area network (VLAN)) technology described below.

Overview of Virtual IP Address Technology Hereinafter, an overview of virtual IP address technology will be described below with reference to FIGS. 6A and 6B. FIGS. 6A and 6B are diagrams respectively showing a configuration and an operation of the communication system 601 using virtual IP address technology. FIG. 6A illustrates the configuration and the operation of the communication system 601 at a normal time. FIG. 6B illustrates the configuration and the operation of the communication system 601 when a malfunction occurs in the active server.

The communication system 601 is a system that switches between the active server and the standby server by using virtual IP address technology (for example, see Non-Patent Literature 1).

In the example illustrated in FIG. 6A, the communication system 601 includes two servers 10 (10a and 10b) and a relay device 20 such as a router. One server 10a out of the two servers 10 functions as a current active server, and the other server 10b functions as a current standby server. The relay device 20 relays communication performed between the server 10 and a client terminal 30 connected via communication lines. Here, a virtual IP address "10.10.1.1" is assumed to be set to the active server in description.

In the example illustrated in FIG. 6A, an IP address "10.10.1.2" and the virtual IP address "10.10.1.1" are set to the current active server 10a. The MAC (Media Access Control) address of a network interface of the current active server 10a is "aa-aa-aa-aa-aa-aa".

On the other hand, no virtual IP address but an IP address "10.10.1.3" is set to the current standby server 10b. The MAC address of the network interface of the current standby server 10b is "bb-bb-bb-bb-bb-bb".

Furthermore, the relay device 20 stores an ARP (Address Resolution Protocol) table 60 in a storage unit not illustrated in the drawing. The ARP table 60 represents a correspondence relationship between an IP address and a MAC address of each server 10.

In the example illustrated in FIG. 6A, MAC addresses "aa-aa-aa-aa-aa-aa", "aa-aa-aa-aa-aa-aa" and "bb-bb-bb-bb-bb-bb" are respectively associated with IP addresses "10.10.1.1", "10.10.1.2", and "10.10.1.3" in the ARP table 60.

Here, the IP address "10.10.1.1" is a virtual IP address set to the active server. Thus, in the example illustrated in FIG. 6A, the MAC address "aa-aa-aa-aa-aa-aa" of the current active server 10a is associated with the virtual IP address "10.10.1.1" set to the active server in the ARP table 60.

Here, it is assumed that the client terminal 30 has transmitted a signal to the IP address "10.10.1.1".

As illustrated in FIG. 6A, the IP address "10.10.1.1" is associated with the MAC address "aa-aa-aa-aa-aa-aa" of the current active server 10a in the ARP table 60 at a normal time. Thus, at this time, the relay device 20 relays the signal transmitted from the client terminal 30 to the current active server 10a on the basis of the ARP table 60 (see a transmission route 70a). As a result, the current active server 10a receives the signal transmitted from the client terminal 30.

Here, it is assumed that a malfunction (for example, a communication failure or the like) has occurred in the current active server 10a.

At this time, the current standby server 10b detects the malfunction of the current active server 10a through heartbeat communication or the like. Then, the current standby server 10b performs startup processing as a new active server by using a virtual IP address (here, the IP address "10.10.1.1") that has been shared between the active server and the standby server in advance.

The startup process as a new active server, as illustrated in FIG. 6B, is performed by the communication system 601 changing the virtual IP address "10.10.1.1" that has been set to the current active server 10a to the current standby server 10b that becomes the new active server 10b. In accordance with this, the setting of the server 10 is switched such that the current active server 10a becomes an old active server, and the current standby server 10b becomes a new active server. Hereinafter, the current active server 10a may be referred to as an "old active server 10a", and the current standby server 10b may be referred to as a "new active server 10b".

As illustrated in FIG. 6B, the new active server 10b broadcasts a G-ARP (Gratuitous Address Resolution Protocol) packet 80 to the relay device 20. This is for causing the relay device 20 to recognize that the setting of virtual IP address "10.10.1.1" has been moved from the old active server 10a to the new active server 10b. The G-ARP packet 80 describes association between the virtual IP address "10.10.1.1" set to the active server and the MAC address "bb-bb-bb-bb-bb-bb" of the new active server 10b.

The relay device 20 that has received the G-ARP packet 80 updates the ARP table 60 on the basis of the G-ARP packet 80 and performs packet routing (control of a transfer path) in accordance with the updated ARP table 60.

In the example illustrated in FIG. 6B, in the ARP table 60 after the update in Step S1150, MAC addresses "bb-bb-bb-bb-bb-bb", "aa-aa-aa-aa-aa-aa", and "bb-bb-bb-bb-bb-bb" are respectively associated with IP addresses "10.10.1.1", "10.10.1.2", and "10.10.1.3".

Here, the IP address "10.10.1.1" is a virtual IP address set to the active server. Thus, in the example illustrated in FIG. 6B, the MAC address "bb-bb-bb-bb-bb-bb" of the new active server 10b is associated with the virtual IP address "10.10.1.1" set to the active server in the ARP table 60 after the update.

Here, it is assumed that the client terminal 30 has transmitted a signal to the IP address "10.10.1.1".

In the ARP table 60, the IP address "10.10.1.1" is associated with the MAC address "bb-bb-bb-bb-bb-bb" of the new active server 10b. For this reason, at this time, the relay device 20 relays the signal transmitted from the client terminal 30 to the new active server 10b on the basis of the ARP table 60 (see a transmission route 70b). Thus, at this time, the new active server 10b receives the signal transmitted from the client terminal 30.

The communication system 601 using such virtual IP address technology can switch between an active server and a standby server.

Overview of Virtual LAN (VLAN) Technology

Hereinafter, an overview of the virtual LAN (VLAN) technology will be described with reference to FIG. 7. FIG. 7 is a diagram showing a configuration and an operation of the communication system 602 using the virtual LAN (VLAN) technology.

The communication system 602 is a system that logically isolates client terminals from each other in order to eliminate interferences from the other client terminals in a configuration in which a plurality of multiple client terminals are connectable to a server by using the virtual LAN (Virtual Local Area Network (VLAN)) technology (for example, see Non-Patent Literature 2).

In the example illustrated in FIG. 7, the communication system 602 includes a server 10 and a relay device 20 such as a router. The server 10 is configured to be able to be connected to a plurality of client terminals 30 (in the example illustrated in FIG. 7, three client terminals 30a, 30b, 30c) operated by clients via the relay device 20. Each client can operate one or more client terminals 30. In the example illustrated in FIG. 7, a case in which three clients operate three client terminals 30a, 30b, and 30c (in other words, a case in which each of three clients operates one client terminal 30) will be assumed in description. However, because each client may operate one or more client terminals 30, there may be cases in which one client operates a plurality of client terminals out of the three client terminals 30a, 30b, and 30c.

Generally, in a case in which a plurality of client terminals are configured to be able to be connected to a server in a communication system, there is a possibility that client terminals can directly communicate with each other depending on the network configuration. When direct communication between client terminals is enabled, one client terminal may adversely affect the other client terminals. For this reason, it is necessary to logically isolate each client terminal for eliminating interferences from the other client terminals in a communication system in a configuration in which a plurality of client terminals are able to be connected to a server.

Thus, as illustrated in FIG. 7, virtual LAN (virtual local area network (VLAN)) technology is used in the communication system 602 as a method for logically isolating client terminals 30 from each other. The VLAN technology is technology for creating virtual LAN segments.

In the VLAN technology, the server 10 creates a VLAN 50 corresponding to a client operating each client terminal 30 for each client terminal 30 in order to prevent communication between the client terminals 30. Then, the server 10 creates a virtual port 40 for each VLAN 50. Each client terminal 30 communicates with the server 10 by transmitting a signal to an IP address set to the virtual port 40 corresponding to the VLAN 50 assigned to each client as a destination. The relay device 20 relays communication performed between the server 10 and each client terminals 30.

For example, in the example illustrated in FIG. 7, the server 10 creates VLANs 50a, 50b, and 50c corresponding to a client operating each client terminal 30 for each of the client terminals 30a, 30b, and 30c. Then, the server 10 creates virtual ports 40a, 40b, and 40c respectively for the VLANs 50a, 50b, and 50c. Each client terminal 30 communicates with the server 10 by transmitting a signal to the IP address set to the virtual port 40 corresponding to the VLAN 50 assigned to each client as a destination.

The communication system 602 using such VLAN technology, by creating a VLAN 50 corresponding to a client operating each client terminal 30 for each client terminal 30, can secure independency of communication between the server 10 and each client terminal 30.

In addition, even in a case in which each client terminal 30 has an independent network system configured by a plurality of terminals, the communication system 602 can maintain the independent network system of each client terminal 30 by separating each client terminal 30 using the VLAN 50.

Conventional Example

Hereinafter, a communication system 603 of a conventional example using the virtual IP address technology and the virtual LAN (VLAN) technology described above will be described with reference to FIGS. 8A and 8B, and FIG. 9. FIGS. 8A and 8B are diagrams illustrating a configuration and an operation of the communication system 603 of the conventional example. FIG. 8A illustrates a configuration and an operation of the communication system 603 of a conventional example at a normal time. FIG. 8B illustrates a configuration and an operation of the communication system 603 of a conventional example when a malfunction occurs in an active server. FIG. 9 is a sequence diagram showing an operation of the communication system 603 of the conventional example.

The communication system 603 of the conventional example is a system that switches between an active server and a standby server while logically isolating client terminals from each other in a configuration in which a plurality of client terminals are connectable to a server by using the virtual IP address technology and the virtual LAN (VLAN) technology described above.

In the example illustrated in FIG. 8A, the communication system 603 of the conventional example includes a plurality of (two in the illustrated example) servers 10 (10a and 10b) and a relay device 20 such as a router. One server 10a out of the two servers 10 functions as a current active server, and the other server 10b functions as a current standby server. The relay device 20 relays communication performed between the server 10 and the client terminal 30 connected via communication lines.

The server 10 is configured to be connectable to a plurality of client terminals 30 (in the example illustrated in FIG. 8A, three client terminals 30a, 30b, and 30c) operated by clients via the relay device 20. Each client can operate one or more client terminals 30. In the example illustrated in FIG. 8A, a case in which three clients operate three client terminals 30a, 30b, and 30c (in other words, each of the three clients operates one client terminal 30) will be assumed in description. However, because each client can operate one or more client terminals 30, there may be cases in which one client operates a plurality of client terminals out of the three client terminals 30a, 30b, and 30c.

The current active server 10a creates VLANs 50a, 50b, and 50c corresponding to a client operating each client terminal 30 for each of the client terminal 30a, 30b, and 30c. Then, the current active server 10a creates virtual ports 40a, 40b, and 40c for the VLANs 50a, 50b, and 50c. The created VLANs 50a, 50b, and 50c are shared between the active server and the standby server. In addition, information relating to the created VLANs 50a, 50b, and 50c is shared between the active server and the standby server.

The relay device 20 stores the ARP table 60 in the storage unit. The ARP table 60 represents a correspondence relationship between an IP address that is a virtual IP address of each of the VLANs 50a, 50b, and 50c, and a MAC address of the current active server 10a.

In the example illustrated in FIG. 8A, MAC addresses "aa-aa-aa-aa-aa-aa", "aa-aa-aa-aa-aa-aa", and "aa-aa-aa-aa-aa-aa" of the current active server 10a are respectively associated with IP addresses "10.10.1.1", "10.10.1.2", and "10.10.1.3" that are virtual IP addresses of VLANs 50a, 50b, and 50c in the ARP table 60.

Each client terminal 30 communicates with the current active server 10a by transmitting a signal to the IP address set to the virtual port 40 corresponding to the VLAN 50 assigned to each client as a destination.

Here, as illustrated in FIG. 9, it is assumed that the client terminal 30 has transmitted a signal to the IP address "10.10.1.1" at a normal time (Step S1310).

As illustrated in FIG. 8A, the MAC address of the current active server 10a is associated with each IP address in the ARP table 60 at a normal time. For this reason, at this time, the relay device 20 relays the signal transmitted from the client terminal 30 to the current active server 10a on the basis of the ARP table 60. As a result, the current active server 10a receives the signal transmitted from the client terminal 30.

Here, as illustrated in FIG. 9, it is assumed that a malfunction (for example, a communication failure or the like) has occurred in the current active server 10a. In this case, the communication system 603 comes into a state in which a request from the client terminal 30 is interrupted (no response state).

At this time, the current standby server 10b detects a malfunction of the current active server 10a (Step S1320). Then, the current standby server 10b creates a virtual port 40 for each VLAN 50 sequentially from the first in order by using a virtual IP address for each VLAN 50 shared between the active server and the standby server in advance (Step S1340), and performs startup processing as a new active server.

The startup processing as a new active server, as illustrated in FIG. 8B, is performed by the communication system 603 changing the MAC address corresponding to the virtual IP address of the VLAN 50 to the MAC address of the current standby server 10b that becomes a new active server. In accordance with this, the setting of the server 10 is switched such that the current active server 10a becomes an old active server, and the current standby server 10b becomes a new active server. Hereinafter, the current active server 10a may be referred to as an "old active server 10a", and the current standby server 10b may be referred to as a "new active server 10b".

As illustrated in FIG. 9, after Step S1340, the new active server 10b broadcasts G-ARP packets 80 to the relay device 20 sequentially from the first in order (Step S1350). This is for causing the relay device 20 to recognize that the setting of the MAC address corresponding to the virtual IP address of the VLAN 50 has been changed from the MAC address of the old active server 10a to the MAC address of the new active server 10b. The G-ARP packet 80 describes association between the virtual IP address of the VLAN 50 and the MAC address "bb-bb-bb-bb-bb-bb" of the new active server 10b. The new active server 10b repeatedly performs the processes of Step S1340 and Step S1350 a number of times corresponding to the number of the VLANs 50.

Every time when a G-ARP packet 80 is received, the relay device 20 updates the ARP table 60 of the VLAN 50 on the basis of the G-ARP packet 80 and performs packet routing (control of a transfer path) in accordance with the updated ARP table 60 of the VLAN 50 (Step S1360).

In the example illustrated in FIG. 8B, the MAC address "bb-bb-bb-bb-bb-bb" of the new active server 10b is associated with the virtual IP address of each of the VLANs 50a, 50b, and 50c in the ARP table 60 after the update in Step S1360.

The relay device 20 relays a signal transmitted from the client terminal 30 to the new active server 10b on the basis of the ARP table 60. As a result, the new active server 10b receives the signal transmitted from the client terminal 30.

In accordance with this, the client terminal 30 corresponding to the VLAN 50 of which the ARP table 60 has been updated is in a state being communicable with the new active server 10b.

However, the client terminal 30 corresponding to VLAN 50 of which the ARP table 60 has not been updated is in a state of being not communicable with the new active server 10b. For this reason, the communication system 603 is in a state in which a request from the client terminal 30 corresponding to the VLAN 50 of which the ARP table 60 has not been updated is interrupted (no response state).

After Step S1360, the new active server 10b creates a virtual port 40 corresponding to the VLAN 50 that is the last in order (Step S1340a) and broadcasts a G-ARP packet 80 corresponding to the VLAN 50 that is the last in order to the relay device 20 (Step S1350a).

In accordance with this, finally, all the client terminals 30 come into a state of being communicable with the new active server 10b. As a result, all the client terminals 30 can communicate with the new active server 10b by transmitting signals to the IP address "10.10.1.1" (Step S1310a).

The communication system 603 of the conventional example using the virtual IP address technology and the virtual LAN (VLAN) technology, by creating a virtual port 40 corresponding to the VLAN 50 assigned to each client, can switch between an active server and a standby server while securing independency of communication between the server 10 and each client terminal 30. In addition, even in a case in which each client terminal 30 has an independent network system configured by a plurality of terminals, by separating each client terminal 30 using the VLAN 50, the communication system 603 can maintain the independent network system of each client terminal 30.

CITATION LIST

Non Patent Literature

Non-Patent Literature 1: ITmedia Inc., "Server is freely controlled to be active/standby", [online], [Searched on Dec. 1, 2017], Internet <URL: http:/www.atmarkit.co.jp/articles/0304/09/news001.html>

Non-Patent Literature 2: site "As a network engineer" "What is VLAN" [online] [Searched on Dec. 4, 2017], Internet <URL: http://www.infraexpert.com/study/vlan-z1.html>

SUMMARY OF THE INVENTION

Technical Problem

However, the communication system of the conventional example using the virtual IP address technology and the virtual LAN (VLAN) technology has a problem that, when the number of VLANs is increased, a switching timing is delayed depending on the VLAN, and there is a possibility that a service interruption time becomes long.

In other words, in the communication system of the conventional example described above, after the current standby server detects a malfunction of the current active server, the processes of creating virtual ports, transmission of G-ARP packets, update of ARP tables, and the like are performed a number of times corresponding to the number of VLANs, and accordingly, there is a possibility that a service interruption time becomes long in a client terminal using a VLAN for which a virtual port is created the last.

The present invention is realized for solving the problems described above, and a main object thereof is to provide a communication system and a server switching method capable of decreasing a service interruption time of a client terminal (particularly, a service interruption time of a client terminal operated by a client having a high usage frequency).

Means for Solving the Problem

In order to solve the problems described above, an invention described in claim 1 is a communication system including: a plurality of servers each functioning as an active system or a standby system; and a relay device that relays communication between a server of the active system and one or more client terminals operated by clients. Each of the servers includes: a priority level determining unit that determines a priority level of each of the clients; a virtual port creating unit that creates, in the server, a virtual port corresponding to a virtual LAN assigned to each of the clients; and a communication processing unit that instructs the relay device to change a destination of communication performed between the client terminal and the server to the virtual port. The communication processing unit gives an instruction of change of the destination of the communication in order of highest to lowest priority level of the client when a malfunction occurs in another server of the active system.

When a server of the standby system is switched to a new server of the active system, this communication system gives an instruction of change of a destination of communication with a client terminal operated by each client (in other words, establishment of communication with the client terminal) in order of highest to lowest priority level of the client, and accordingly, a service interruption time of a client terminal can be decreased as the client terminal is operated by a client having a higher priority level.

In addition, in order to solve the problems described above, an invention described in claim 5 is a server switching method including: determining, by using a server of a standby system, a priority level of each of clients when a malfunction occurs in a server of an active system among a plurality of servers arranged to be able to communicate with one or more client terminals operated by the clients through a relay device; creating, in the server, by using the server of the standby system, a virtual port corresponding to a virtual LAN assigned to each of the clients; and instructing, by using the server of the standby system, the relay device to change a destination of communication performed between the client terminal and the server to the virtual port in order of highest to lowest priority level of the client.

According to this server switching method, when a server of the standby system is switched to a new server of the active system, an instruction of change of a destination of communication with a client terminal operated by each client (in other words, establishment of communication with the client terminal) is given in order of highest to lowest priority level of the client, and accordingly, a service interruption time of a client terminal can be decreased as the client terminal is operated by a client having a higher priority level.

In addition, according to an invention described in claim 2, in the communication system described in claim 1, the server repeatedly creates the virtual port by using the virtual port creating unit and gives the instruction of change of the destination of the communication by using the communication processing unit, in order of highest to lowest priority level of the client when a malfunction occurs in another server of the active system.

According to this configuration, because creation of a virtual port and giving of an instruction of change of a destination of the communication are performed in order of highest to lowest priority level of the client, a load of the server of the standby system when the server of the standby system is switched to a new server of the active system can be reduced.

In addition, according to an invention described in claim 3, in the communication system described in claim 1 or 2, the instruction of change of the destination of the communication by using the communication processing unit is given by transmitting a G-ARP packet including a virtual IP address corresponding to the virtual LAN and a MAC address corresponding to the virtual IP address to the relay device.

According to this configuration, because a destination of communication can be changed by the server of the standby system only transmitting a G-ARP packet to the relay device, a load of the server of the standby system when the server of the standby system is switched to a new server of the active system can be reduced.

In addition, according to an invention described in claim 4, in the communication system according to any one of claims 1 to 3, the priority level determining unit determines the priority level of each of the clients on the basis of a usage frequency of the virtual LAN assigned to each of the clients.

According to this configuration, because a client having a higher usage frequency is the client having a higher priority level, particularly, a service interruption time of a client terminal operated by a client having a high priority level can be decreased.

Effects of the Invention

According to the present invention, a service interruption time of a client terminal (particularly, a service interruption time of a client terminal operated by a client having a high priority level) can be decreased.

BRIEF DESCRIPTION OF DRAWINGS

FIG. 4A is a diagram showing one example of client data used in an embodiment.

FIG. 4B is a diagram showing one example of virtual IP data used in an embodiment.

DESCRIPTION OF EMBODIMENTS

Figure 1A:
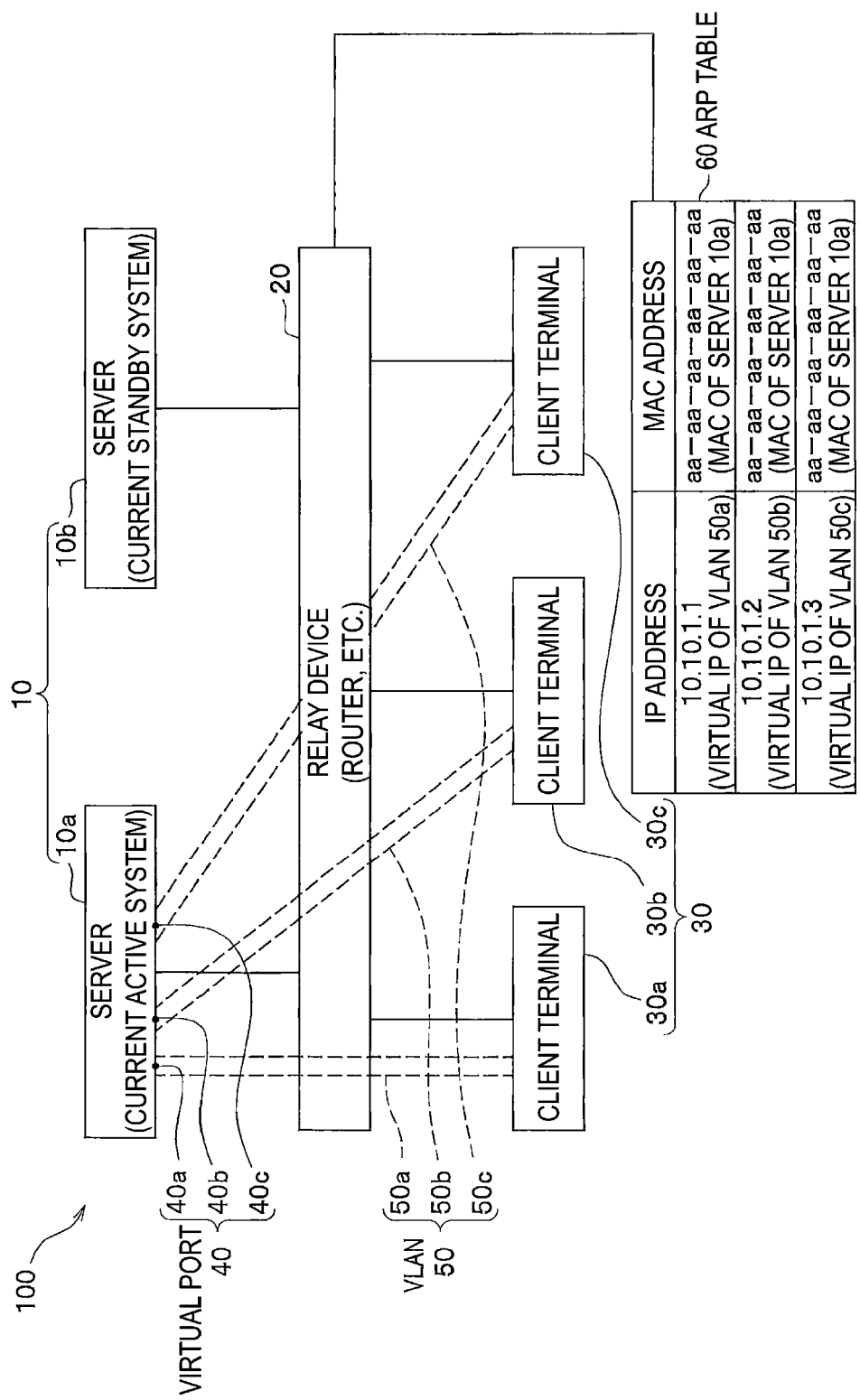
FIG. 1A is a diagram (1) showing a configuration and an operation of a communication system according to an embodiment.

An embodiment of the present invention (hereinafter, referred to as "present embodiment") will be described in detail with reference to the drawings. Each of the diagrams is merely illustrated schematically to a degree enabling sufficient understanding of the present invention. Thus, the present invention is not limited to illustrated examples. In the drawings, the same reference signs are assigned to common constituent elements and the same constituent elements, and duplicate description thereof will be omitted.

Embodiment

Configuration of Communication System

Figure 1B:
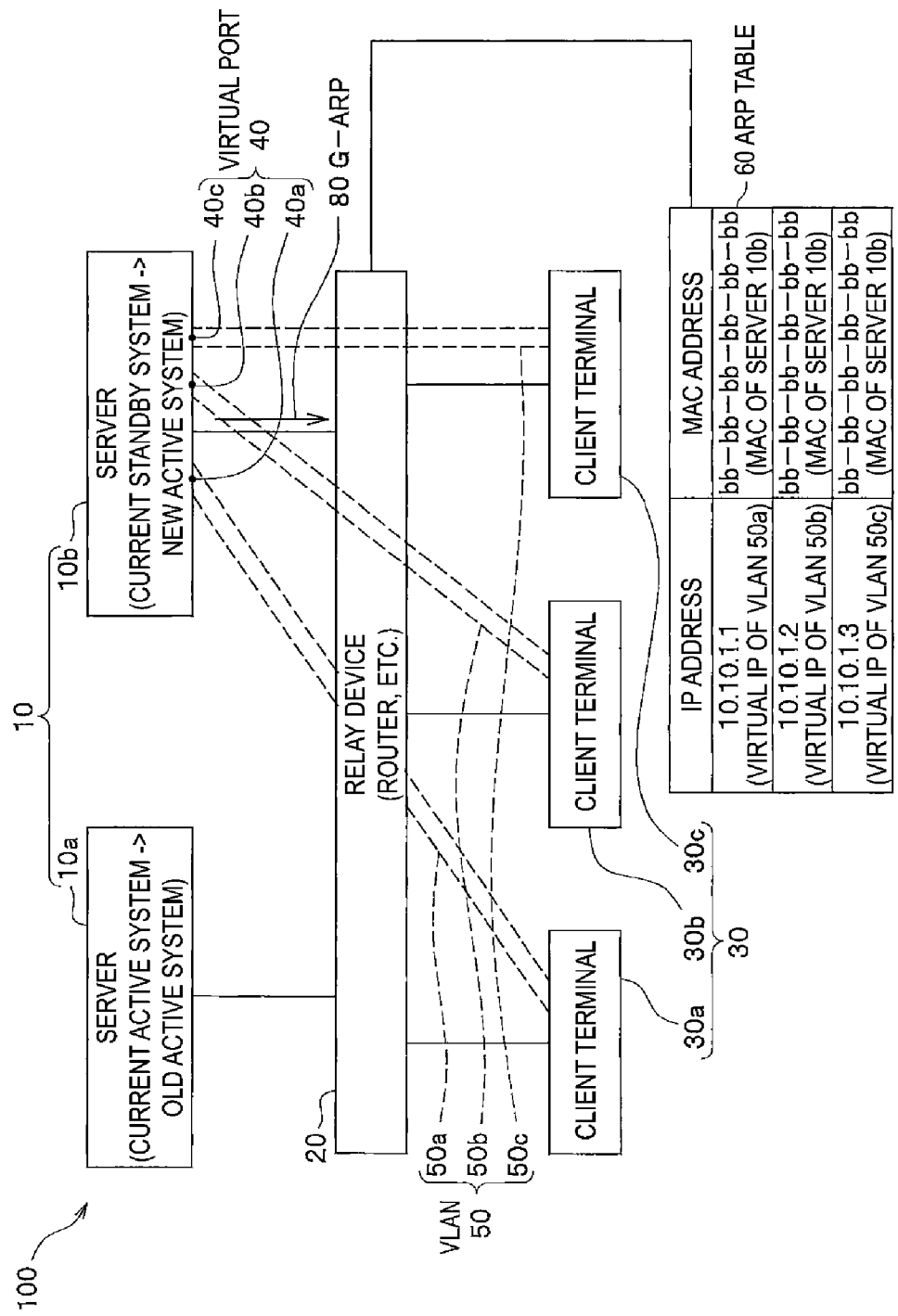
FIG. 1B is a diagram (2) showing a configuration and an operation of a communication system according to an embodiment.

A communication system 100 according to the present embodiment will be described below with reference to FIGS. 1A and 1B. FIGS. 1A and 1B are diagrams illustrating configurations and operations of the communication system 100 according to the present embodiment. FIG. 1A illustrates a configuration and an operation of the communication system 100 according to the present embodiment at a normal time. FIG. 1B illustrates a configuration and an operation of the communication system 100 according to the present embodiment when a malfunction of an active server occurs.

The communication system 100 according to the present embodiment is a system that switches between an active server and a standby server by using virtual IP address technology and virtual LAN (VLAN) technology.

In the example illustrated in FIG. 1A, the communication system 100 according to the present embodiment includes a plurality of (two in the illustrated example) of servers 10 (10a, 10b) and a relay device 20 such as a router. One server 10a out of the two servers 10 functions as a current active server, and the other server 10b functions as a current standby server. The relay device 20 relays communication performed between the server 10 and the client terminal 30 that are connected via communication lines.

The server 10 is configured to be able to be connected to a plurality of client terminals 30 (in the example illustrated in FIG. 1A, three client terminals 30a, 30b, and 30c) via the relay device 20. Each client can operate one or more client terminals 30. In the example illustrated in FIG. 1A, a case in which three clients operate three client terminals 30a, 30b, and 30c (in other words, each of the three clients operates one terminal 30) will be assumed in description. However, because each client may operate one or more client terminals 30, there may be cases in which one client operates a plurality of client terminals out of the three client terminals 30a, 30b, and 30c.

The current active server 10a creates VLANs 50a, 50b, and 50c corresponding to a client operating each client terminal 30 for each of the client terminals 30a, 30b, and 30c. Then, the current active server 10a creates virtual ports 40a, 40b, and 40c for the VLANs 50a, 50b, and 50c. The created VLANs 50a, 50b, and 50c are shared between the active server and the standby server. In addition, information relating to the created VLANs 50a, 50b, and 50c is shared between the active server and the standby server.

The relay device 20 stores an ARP table 60 in a storage unit. The ARP table 60 represents a correspondence relationship between an IP address that is a virtual IP address of each of the VLANs 50a, 50b, and 50c, and a MAC address of the current active server 10a.

In the example illustrated in FIG. 1A, MAC addresses "aa-aa-aa-aa-aa-aa", "aa-aa-aa-aa-aa-aa", and "aa-aa-aa-aa-aa-aa" of the current active server 10a are respectively associated with IP addresses "10.10.1.1", "10.10.1.2", and "10.10.1.3" that are virtual IP addresses of VLANs 50a, 50b, and 50c in the ARP table 60.

Each client terminal 30 communicates with the current active server 10a by transmitting a signal to the IP address set to the virtual port 40 corresponding to the VLAN 50 assigned to each client as a destination.

As illustrated in FIG. 1B, when a malfunction occurs in the current active server 10a, the current standby server 10b becomes a new active server, and the current active server 10a becomes an old active server. Details of this operation will be described in the section "Operation of communication system" to be described later.

Configuration of Server

Figure 2:
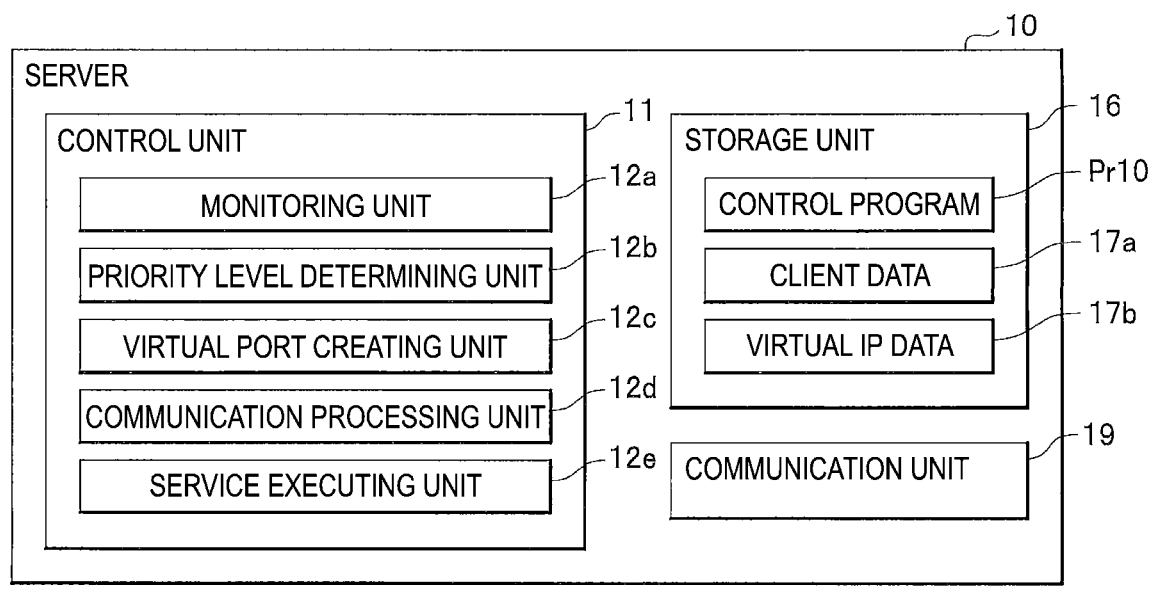
FIG. 2 is a diagram showing the configuration of a server according to an embodiment.

Hereinafter, the configuration of the server 10 will be described with reference to FIG. 2. FIG. 2 is a diagram showing the configuration of the server 10. As illustrated in FIG. 2, in the present embodiment, the server 10 includes a control unit 11 that performs various operations, a storage unit 16 that stores various programs and data, and a communication unit 19 that communicates with other devices.

The control unit 11 is configured using a CPU (Central Processing Unit). In the present embodiment, the control unit 11 functions as a monitoring unit 12a, a priority level determining unit 12b, a virtual port creating unit 12c, a communication processing unit 12d, and a service executing unit 12e by executing a control program Pr10 stored in the storage unit 16 in advance.

The monitoring unit 12a is a functional unit for monitoring presence/absence of an occurrence of a malfunction (for example, a communication failure) of the current active server. The priority level determining unit 12b is a functional unit for determining a priority level of each client. In the present embodiment, the priority level determining unit 12b is configured to determine a priority level of each client on the basis of a usage frequency of the VLAN 50 assigned to each client.

The virtual port creating unit 12c is a functional unit for creating a virtual port 40 when a setting of a server is changed from an old active server to a new active server. The communication processing unit 12d is a functional unit for controlling communication with other devices. In the present embodiment, the communication processing unit 12d is configured to instruct the relay device 20 to change a destination of communication performed between the communication processing unit and the client terminal 30 to the virtual port 40.

The service executing unit 12e is a functional unit for executing various services provided for the client terminal 30.

The storage unit 16 is configured by a RAM (Random Access Memory) and a ROM (Read Only Memory), a hard disk drive, a flash memory, a solid state drive, or the like. In the present embodiment, the storage unit 16 stores the control program Pr10, the client data 17a (see FIG. 4A), and the virtual IP data 17b (see FIG. 4B).

The client data 17a is data relating to each client terminal 30.

The virtual IP data 17b is data relating to the virtual port 40 (see FIG. 1A).

The client data 17a and the virtual IP data 17b will be described later.

Configuration of Relay Device

Figure 3:
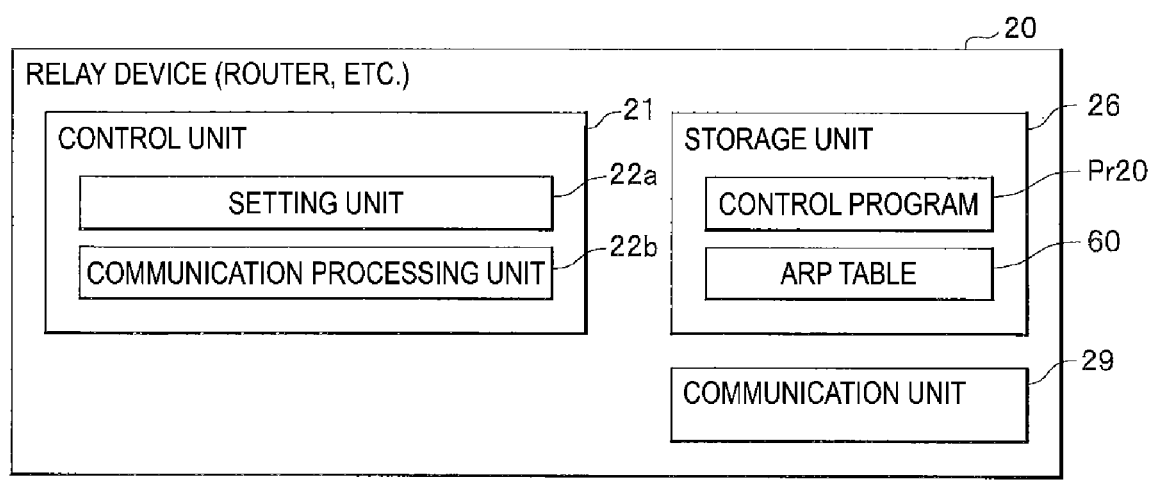
FIG. 3 is a diagram showing the configuration of a relay device according to an embodiment.

Hereinafter, a configuration of the relay device 20 will be described with reference to FIG. 3. FIG. 3 is a diagram showing the configuration of the relay device 20. As illustrated in FIG. 3, in the present embodiment, the relay device 20 includes a control unit 21 that performs various arithmetic operations, a storage unit 26 that stores various programs and data, and a communication unit 29 that communicates with other devices.

The control unit 21 is configured by a CPU. In the present embodiment, the control unit 21 functions as a setting unit 22a and a communication processing unit 22b by executing the control program Pr20 stored in the storage unit 26 in advance.

The setting unit 22a is a functional unit for updating a setting of the ARP table 60 stored in the storage unit 26 on the basis of the G-ARP packet 80 (see FIG. 1B)transmitted from the server 10.

The communication processing unit 22b is a functional unit for controlling communication with other devices. In the present embodiment, the communication processing unit 22b is configured to relay communication performed between the active server and the client terminal 30.

The storage unit 26 is configured by a RAM and a ROM, a hard disk drive, a flash memory, a solid state drive, or the like. In the present embodiment, the storage unit 26 stores the control program Pr20 and the ARP table 60 (see FIG. 1A).

Configuration of Data Stored in Server

Hereinafter, the configuration of the client data 17a will be described with reference to FIG. 4A. FIG. 4A is a diagram showing one example of the client data 17a. In the example illustrated in FIG. 4A, the client data 17a includes data such as "client No.", "previous usage time", "accumulated usage time", and "usage frequency". The "client No." represents a code that is uniquely set to each client. The "previous usage time" represents a previous usage time of each client. The "accumulated usage time" represents the accumulated usage time of each client. The "usage frequency" represents a usage frequency of the VLAN 50 assigned to each client.

Hereinafter, the configuration of the virtual IP data 17b will be described with reference to FIG. 4B. FIG. 4B is a diagram showing one example of the virtual IP data 17b used in the present embodiment. In the example illustrated in FIG. 4B, virtual IP data 17b includes data such as "virtual port No.", "IP address", and "MAC address". The "virtual port No." represents a code that is uniquely set to a virtual port 40 corresponding to each VLAN 50. The "IP address" represents a virtual IP address of each VLAN 50. The "MAC address" represents a MAC address of the active server.

Operation of Communication System

Figure 5:
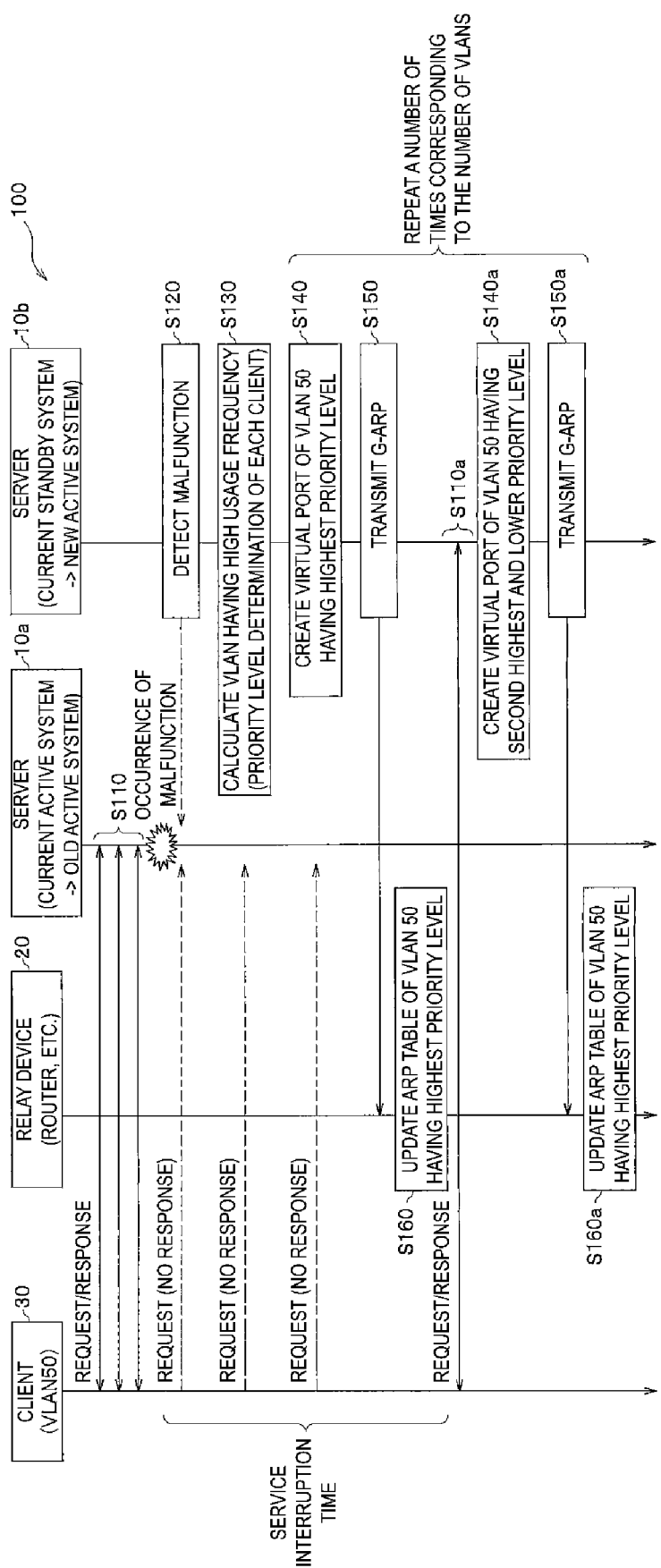
FIG. 5 is a sequence diagram showing an operation of a communication system according to an embodiment.
Figure 6A:
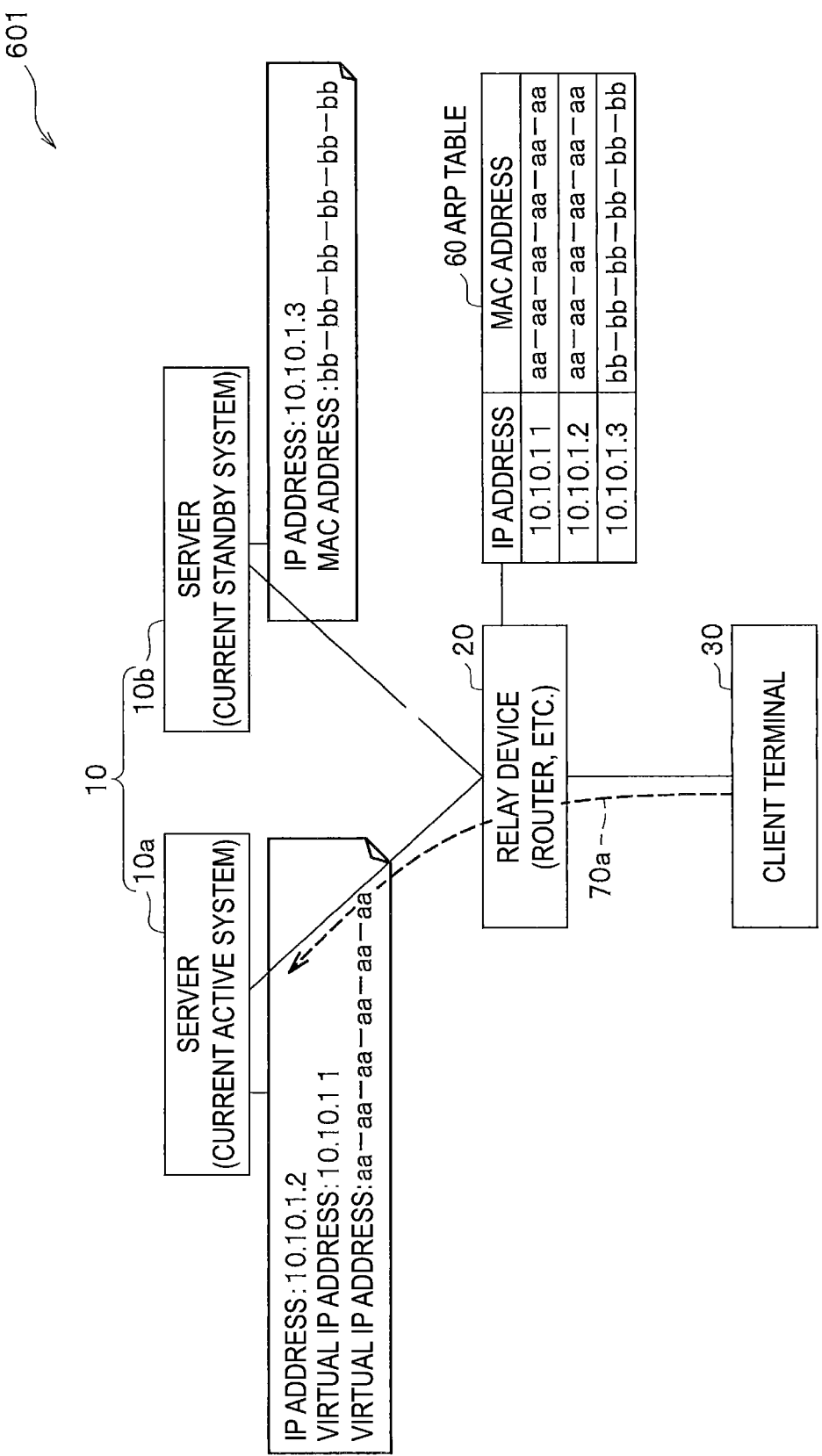
FIG. 6A is a diagram (1) showing a configuration and an operation of a communication system using virtual IP address technology.
Figure 6B:
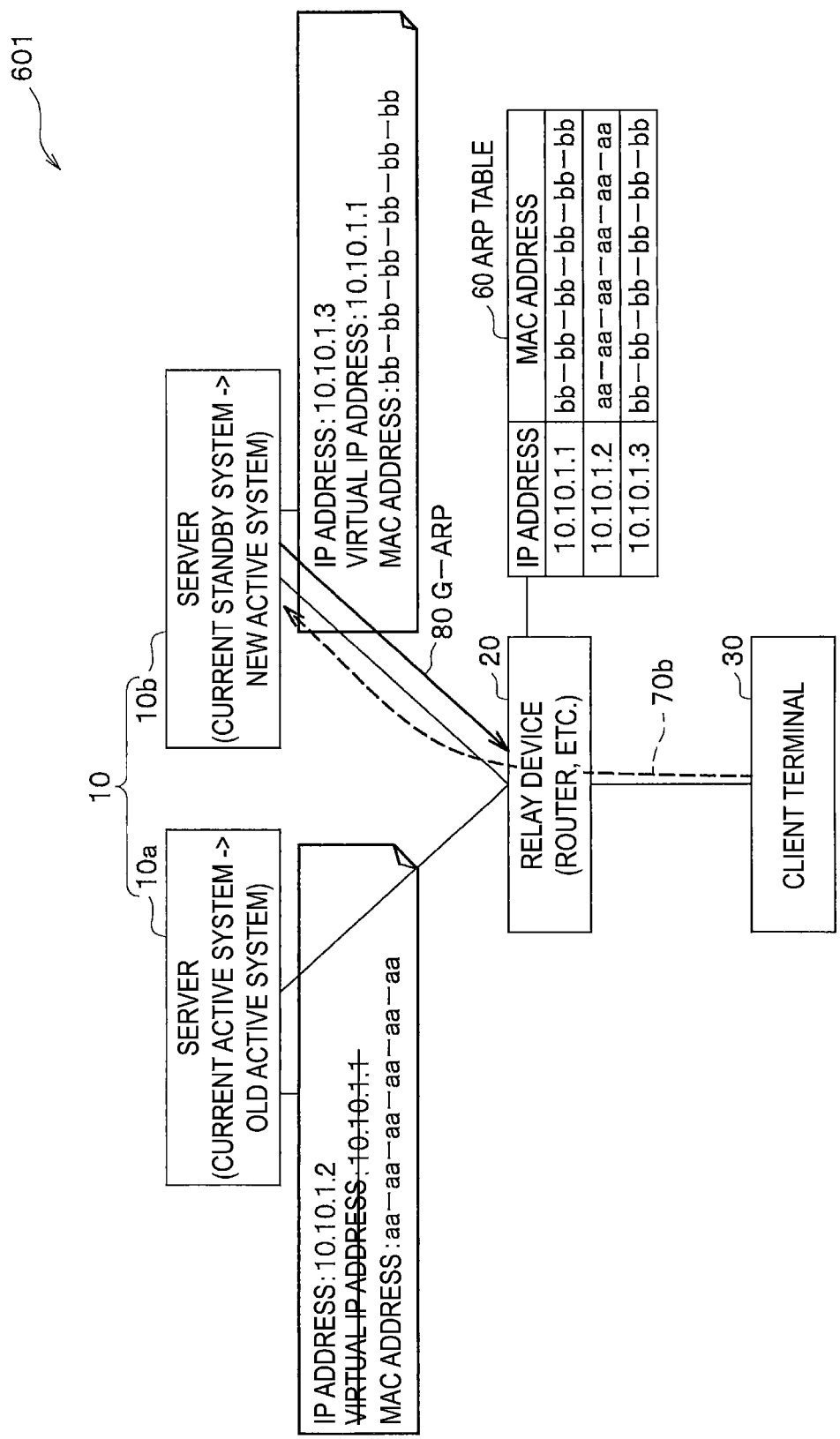
FIG. 6B is a diagram (2) showing a configuration and an operation of a communication system using virtual IP address technology.
Figure 7:
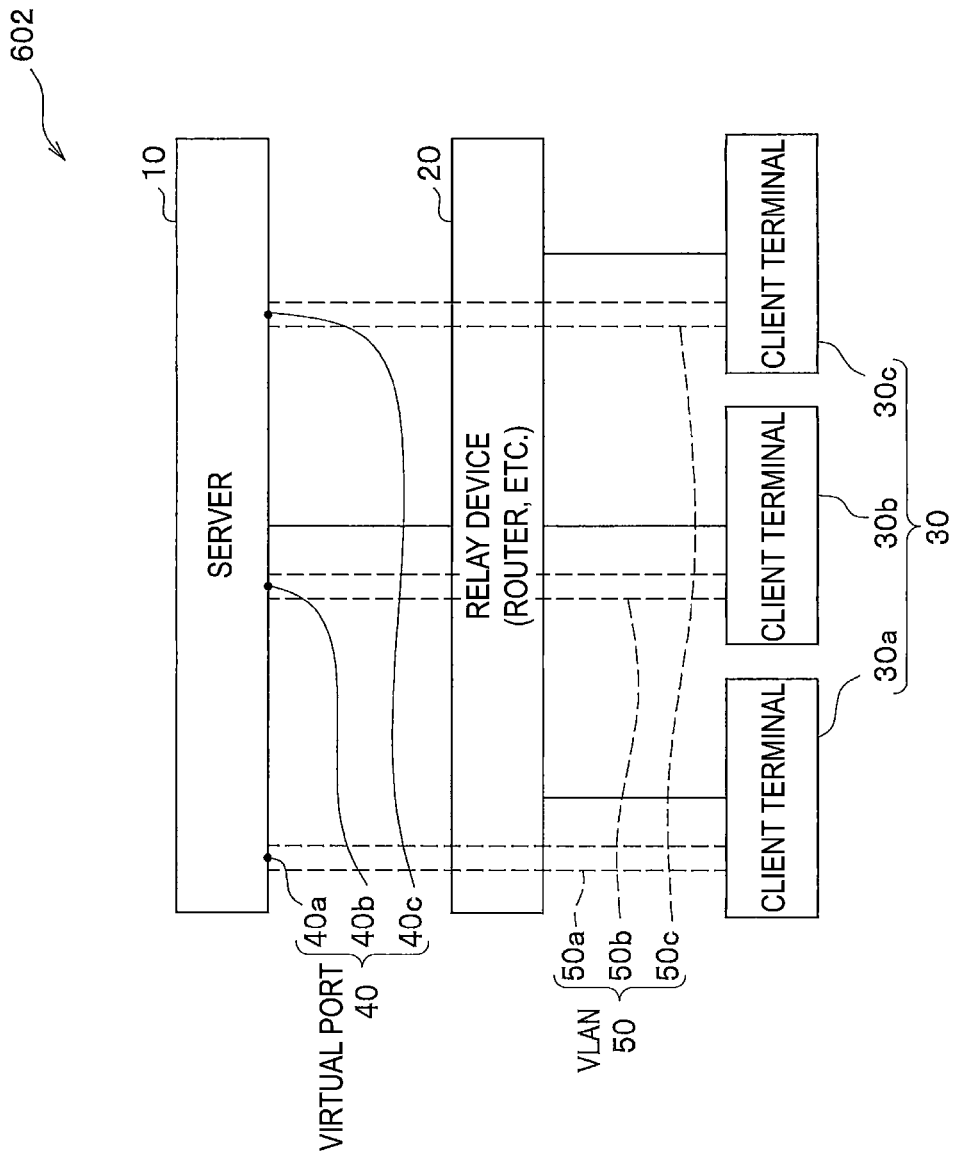
FIG. 7 is a diagram (1) showing a configuration and an operation of a communication system using virtual LAN (VLAN) technology.
Figure 8A:
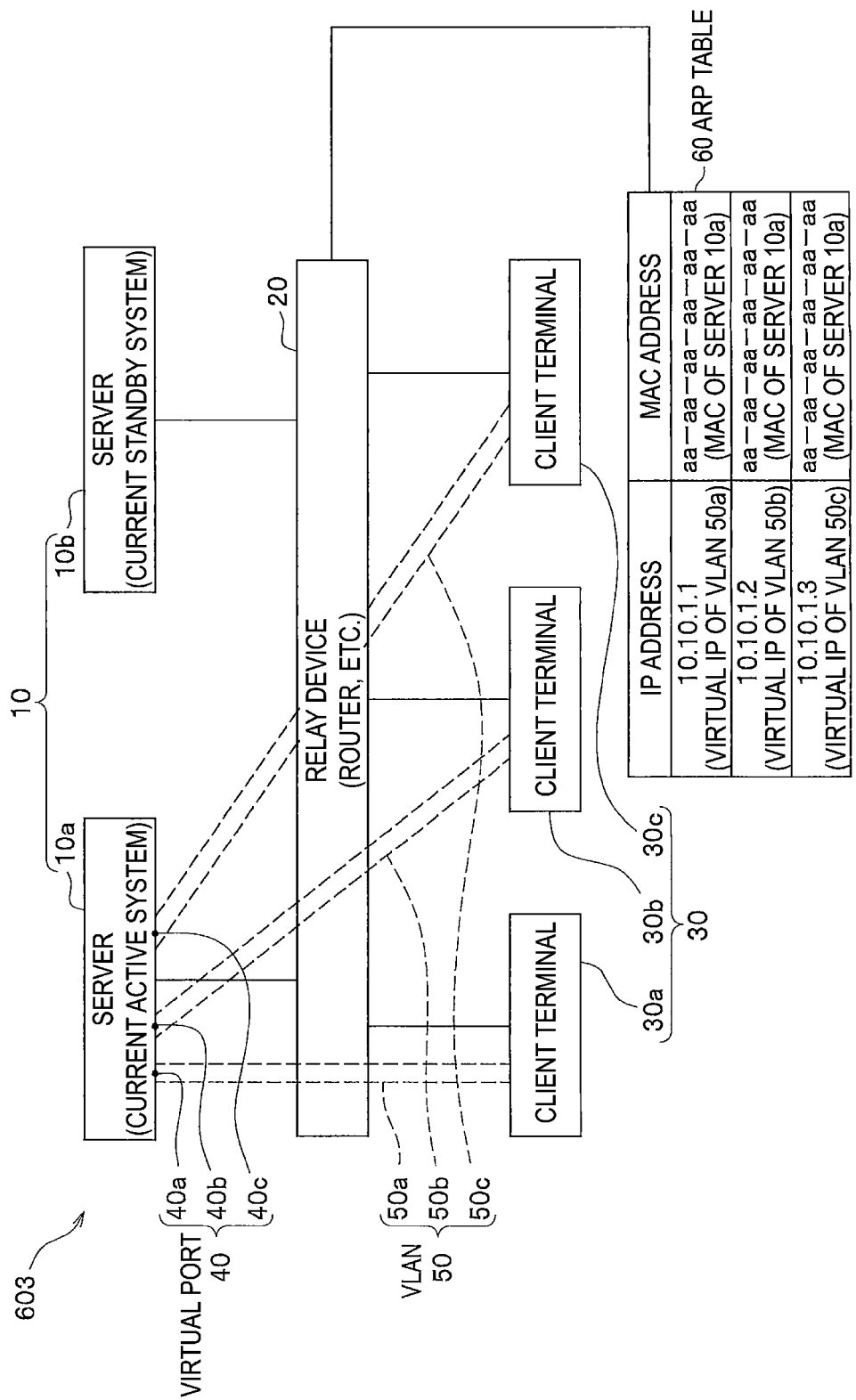
FIG. 8A is a diagram (1) showing a configuration and an operation of a communication system of a conventional example.
Figure 8B:
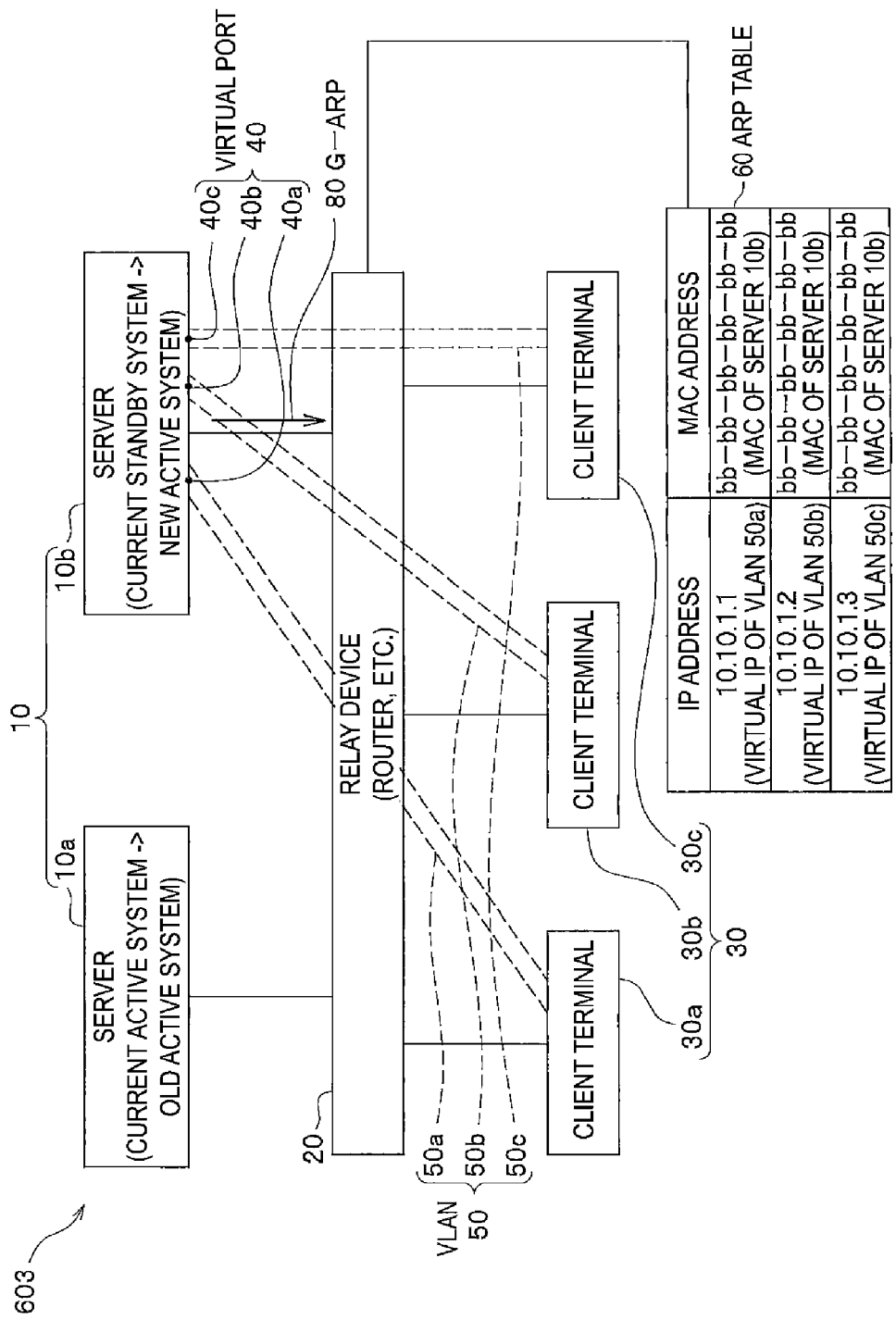
FIG. 8B is a diagram (2) showing a configuration and an operation of a communication system of a conventional example.

Hereinafter, an operation of the communication system 100 will be described below with reference to FIG. 5. FIG. 5 is a sequence diagram showing the operation of the communication system 100.

Here, as illustrated in FIG. 5, it is assumed that, the client terminal 30 has transmitted a signal to an IP address "10.10.1.1" at a normal time (Step S110).

As illustrated in FIG. 1A, in the ARP table 60, the MAC address of the current active server 10a is associated with each IP address at the normal time. For this reason, at this time, the relay device 20 relays the signal transmitted from the client terminal 30 to the current active server 10a on the basis of the ARP table 60. As a result, the current active server 10a receives the signal transmitted from the client terminal 30.

Here, as illustrated in FIG. 5, it is assumed that a malfunction (for example, a communication failure or the like) has occurred in the current active server 10a. In this case, the communication system 100 comes into a state in which a request from the client terminal 30 is interrupted (no response state).

At this time, the monitoring unit 12a of the current standby server 10b detects the malfunction of the current active server 10a (Step S120). Then, the priority level determining unit 12b of the current standby server 10b calculates a VLAN 50 having a high usage frequency by referring to the client data 17a stored in the storage unit 16 and determines a priority level of each client on the basis of the usage frequency of the VLAN 50 (Step S130). At this time, the priority level determining unit 12b determines a priority level of each client by determining that a client corresponding to a VLAN 50 having a higher usage frequency is a client having a higher priority level.

Next, the virtual port creating unit 12*c* of the current standby server 10*b* creates a virtual port 40 for a VLAN 50 having the highest priority level by using a virtual IP address corresponding to the VLAN 50 shared between the active server and the standby server in advance (Step S140), and performs startup processing as a new active server.

The startup processing as a new active server, as illustrated in FIG. 1B, is performed by the communication system 100 changing the MAC address corresponding to the virtual IP address of the VLAN 50 to a MAC address of the current standby server 10*b* that becomes a new active server. In accordance with this, the setting of the server 10 is switched such that the current active server 10*a* becomes an old active server, and the current standby server 10*b* becomes a new active server.

As illustrated in FIG. 5, after Step S140, the communication processing unit 12*d* of the new active server 10*b* broadcasts a G-ARP packet 80 corresponding to the VLAN 50 having the highest priority level to the relay device 20 (Step S150). This is for causing the relay device 20 to recognize that the setting of the MAC address corresponding to the virtual IP address of the VLAN 50 having the highest priority level has been changed from the MAC address of the old active server 10*a* to the MAC address of the new active server 10*b*. The G-ARP packet 80 describes association between the virtual IP address of the VLAN 50 having the highest priority level and the MAC address "bb-bb-bb-bb-bb-bb" of the new active server 10*b*.

The relay device 20 that has received the G-ARP packet 80 updates the ARP table 60 of the VLAN 50 having the highest priority level on the basis of the G-ARP packet 80 and performs packet routing (control of a transfer path) in accordance with the updated ARP table 60 of the VLAN 50 (Step S160).

Here, it is assumed that the client terminal 30 corresponding to the VLAN 50 for which the update has been completed has transmitted a signal to the IP address "10.10.1.1" (Step S110*a*). At this time, as illustrated in FIG. 1B, the relay device 20 relays the signal transmitted from the client terminal 30 to the new active server 10*b* on the basis of the ARP table 60. As a result, the new active server 10*b* receives the signal transmitted from the client terminal 30.

In accordance with this, the client terminal 30 corresponding to the VLAN 50 of which the ARP table 60 has been updated is in a state of being communicable with the new active server 10*b*. As a result, the new active server 10*b* communicates with the client terminal 30 corresponding to the VLAN 50 for which the update has been completed. At this time, the service executing unit 12*e* of the new active server 10*b* executes various services provided for the client terminal 30.

After Step S110*a*, the virtual port creating unit 12*c* of the new active server 10*b* creates virtual ports 40 corresponding to VLANs 50 having the second highest and lower priority levels (Step S140*a*). Then, the communication processing unit 12*d* of the new active server 10*b* broadcasts G-ARP packets 80 corresponding to the VLANs 50 having the second highest and lower priority levels to the relay device 20 (Step S150*a*). The new active server 10*b* repeatedly performs the processes of Steps S140*a* and S150*a* a number of times corresponding to the number of VLANs 50.

Every time when the G-ARP packet 80 is received, the relay device 20 updates the ARP tables 60 of the VLANs 50 having the second highest and lower priority levels on the basis of the G-ARP packet 80 and performs packet routing (control of a transfer path) according to the updated ARP tables 60 of the VLANs 50 (Step S160*a*).

In accordance with this, finally, all the client terminals 30 come into a state of being communicable with the new active server 10*b*. As a result, all the client terminals 30 can communicate with the new active server 10*b* by transmitting signals to the IP address "10.10.1.1" (see Step S110*a* illustrated in FIG. 1B).

In the example illustrated in FIG. 1B, in the ARP table 60 after the update in Step S160*a*, the MAC address "bb-bb-bb-bb-bb-bb" of the new active server 10*b* is associated with the virtual IP address of each of the VLANs 50*a*, 50*b*, and 50*c*.

The communication system 100 according to the present embodiment using the virtual IP address technology and the virtual LAN (VLAN) technology, by creating a virtual port 40 corresponding to the VLAN 50 assigned to each client, can switch between an active server and a standby server while securing independency of communication between the server 10 and each client terminal 30. In addition, even in a case in which each client terminal 30 has an independent network system configured by a plurality of terminals, by separating each client terminal 30 using the VLAN 50, the communication system 100 can maintain the independent network system of each client terminal 30.

In addition, when the current standby server 10*b* is switched as a new active server, the communication system 100 sets a client corresponding to the VLAN 50 of which a usage frequency is high as a client having a high priority level and gives an instruction of changing a destination of communication with the client terminal 30 operated by each client (in other words, establishment of communication with the client terminal 30) in order of highest to lowest priority level of the client.

Figure 9:
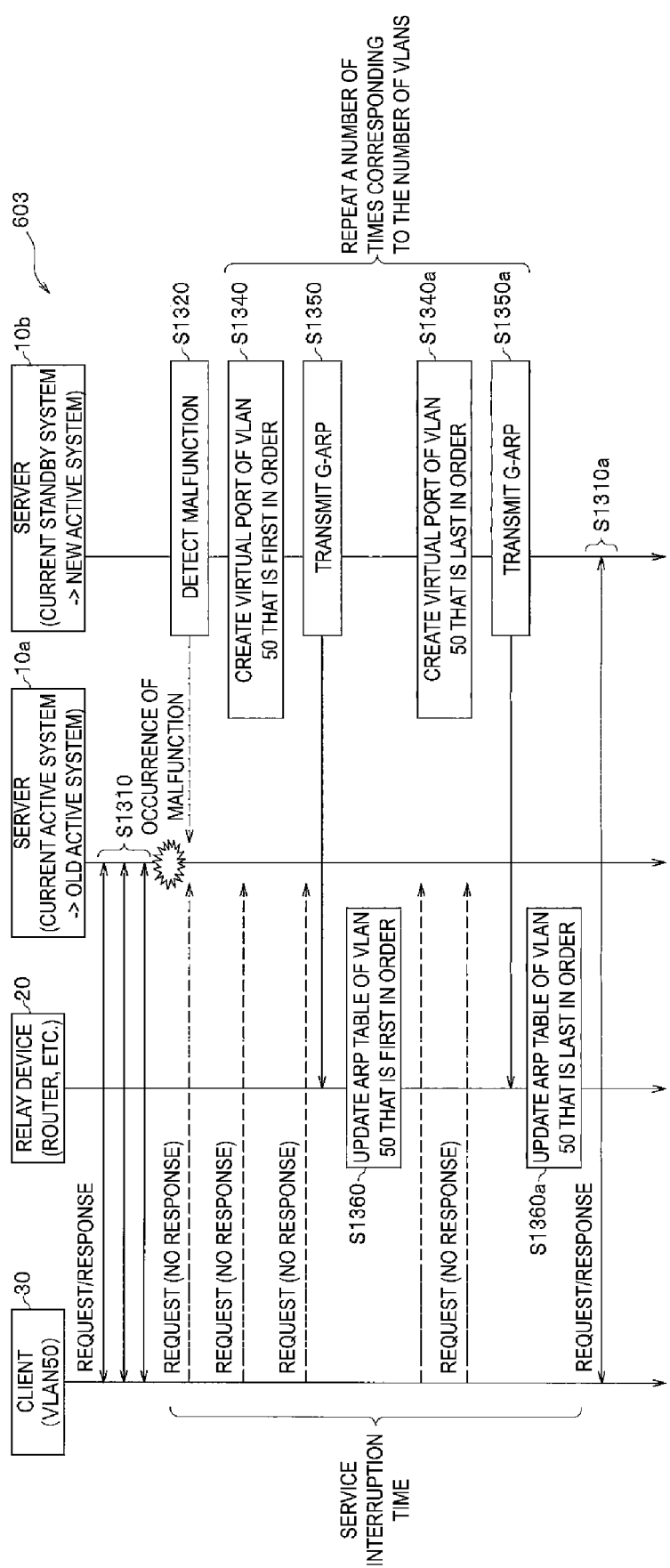
FIG. 9 is a sequence diagram showing an operation of a communication system of a conventional example.

As can be known from comparison between the service interruption time of the communication system 603 of the conventional example illustrated in FIG. 9 and the service interruption time of the communication system 100 according to this embodiment illustrated in FIG. 5, such a communication system 100 can decrease the service interruption time of the client terminal 30. Particularly, a client having a high usage frequency is a client having a high priority level. The communication system 100 can decrease the service interruption time of the client terminal 30 operated by the client having the high priority level.

As described above, according to the communication system 100 of the present embodiment, the service interruption time of the client terminal 30 can be decreased. Particularly, according to the communication system 100, the service interruption time of the client terminal 30 operated by the client having a high priority level can be decreased.

The present invention is not limited to the embodiments described above, and various changes and modifications can be made in a range not departing from the concept of the present invention.

For example, the embodiments described above are described in detail for describing the concept of the present invention to be easily understood. Thus, the present invention is not limited to necessarily include all the described constituent elements. In addition, in the present invention, other constituent elements may be added to the existing constituent elements, or some constituent elements may be changed to other constituent elements. Furthermore, in the present invention, some constituent elements may be removed.

For example, in the embodiment described above, the priority level determining unit 12*b* has been described to determine the priority level of each client on the basis of the usage frequency of the VLAN 50 assigned to each client. However, for example, the priority level determining unit 12*b* may determine the priority level of each client on the basis of an accumulated usage time of the VLAN 50 assigned to each client. Alternatively, for example, the priority level determining unit 12*b* may determine the priority level of each client on the basis of a degree of importance of each client terminal 30 set in advance.

The invention claimed is:

1. A communication system comprising:
    a plurality of servers each functioning as an active system or a standby system; and
    a relay device that relays communication between a server of the active system and one or more client terminals operated by clients,
    wherein
    each of the servers includes:
        a priority level determining unit that determines a priority level of each of the clients,
        a virtual port creating unit that creates, in the server, a virtual port corresponding to a virtual local area network (LAN) assigned to each of the clients, and
        a communication processing unit that instructs the relay device to change a destination of communication performed between the client terminal and the server to the virtual port, and
    wherein the communication processing unit gives an instruction to change the destination of the communication in order of highest to lowest priority level of each of the clients when a malfunction occurs in another server of the active system.

2. The communication system according to claim 1, wherein the server repeatedly creates the virtual port by using the virtual port creating unit and gives the instruction of change of the destination of the communication by using the communication processing unit, in order of highest to lowest priority level of each of the clients when a malfunction occurs in another server of the active system.

3. The communication system according to claim 1, wherein the instruction of change of the destination of the communication by using the communication processing unit is given by transmitting a Gratuitous Address Resolution Protocol (G-ARP) packet including a virtual internet protocol (IP) address corresponding to the virtual LAN and a media access control (MAC) address corresponding to the virtual IP address to the relay device.

4. The communication system according to any one of claims 1, wherein the priority level determining unit determines the priority level of each of the clients based on a usage frequency of the virtual LAN assigned to each of the clients.

5. A server switching method comprising:
    determining, by using a server of a standby system, a priority level of each of clients when a malfunction occurs in a server of an active system among a plurality of servers arranged to be able to communicate with one or more client terminals operated by the clients through a relay device;
    creating, in the server and by using the server of the standby system, a virtual port corresponding to a virtual local area network (LAN) assigned to each of the clients; and
    instructing, by using the server of the standby system, the relay device to change a destination of communication performed between the client terminal and the server to the virtual port in order of highest to lowest priority level of the client.

* * * * *